Oct. 9, 1928.

J. B. MANKIN 1,686,758

ROTARY VALVE INTERNAL COMBUSTION ENGINE

Filed Aug. 17, 1925

J. B. Mankin,
Inventor

By Royal R. Rommel
Attorney

Oct. 9, 1928.　　　　　　　　　　　　　　　　　1,686,758
J. B. MANKIN
ROTARY VALVE INTERNAL COMBUSTION ENGINE
Filed Aug. 17, 1925　　　3 Sheets-Sheet 2
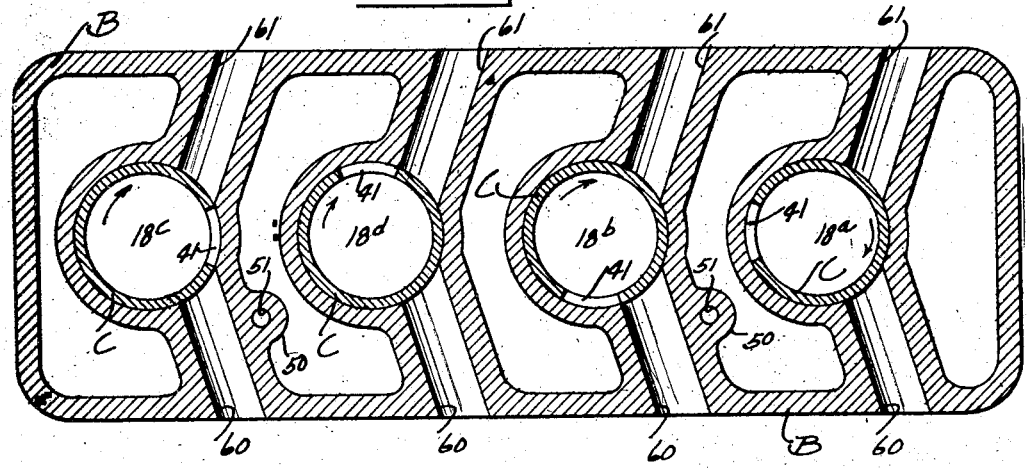
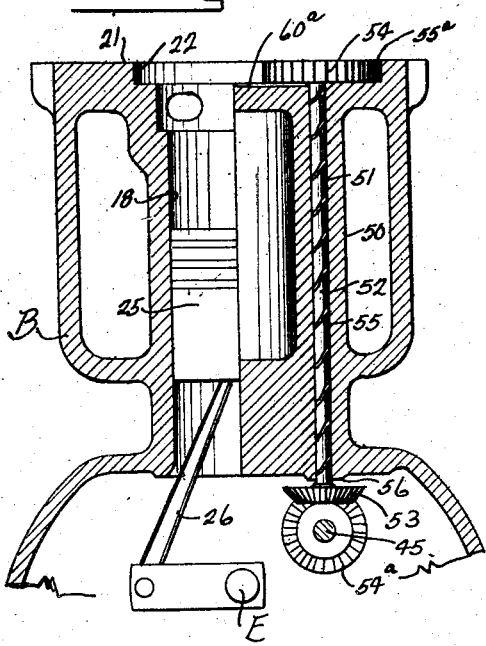
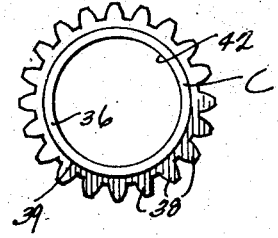
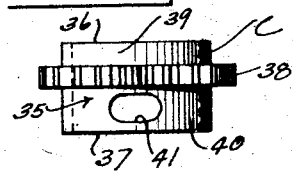
J.B. Mankin,
Inventor
By Royal R. Rommel
Attorney

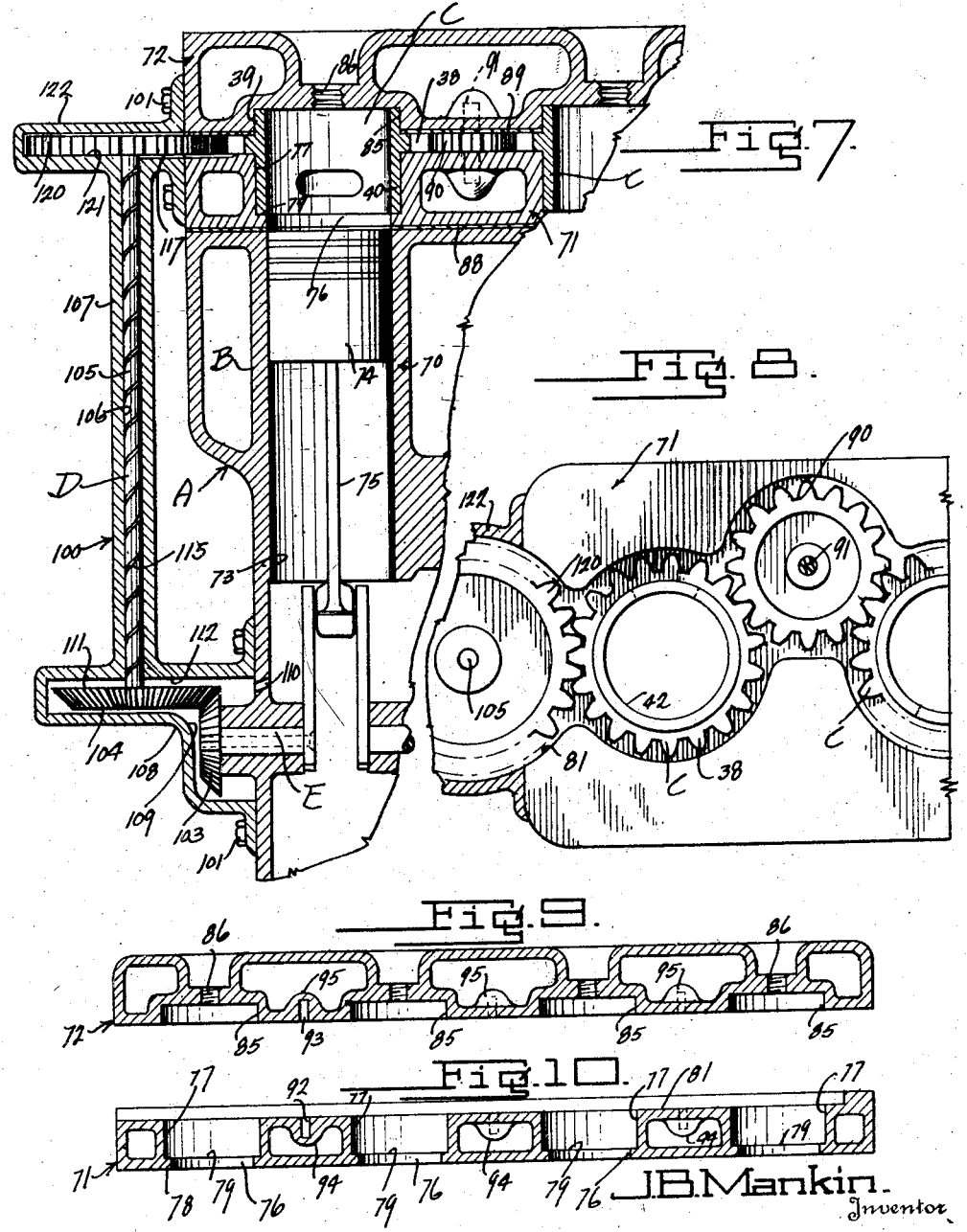

Patented Oct. 9, 1928.

1,686,758

UNITED STATES PATENT OFFICE.

JAMES B. MANKIN, OF NORTH CHATTANOOGA, TENNESSEE.

ROTARY-VALVE INTERNAL-COMBUSTION ENGINE.

Application filed August 17, 1925. Serial No. 50,693.

This invention relates to improvements in internal combustion engines, and has particular reference with respect to a novel rotary valve type.

The primary object of this invention is the provision of a rotary valve internal combustion engine, embodying a novel type of rotary valve which is very simple, and which may be used for efficiently controlling the intake and exhaust ports of the cylinders of the internal combustion engine, without eccentric motion such as is necessary with conventional poppet valves; it being a feature of this invention that in a multi-cylinder engine, one of the improved valves is provided for each cylinder of the engine, all of the valves being driven in synchronism with each other and with the crank shaft of the internal combustion engine.

A further object of this invention is the provision of a novel type of ported rotary valve construction for internal combustion engines, the same being preferably cylindrical and hollow to control the passage of gases; the valve being provided with gear teeth in a novel relation thereon to permit the most efficient placing of the valve with respect to the casing of the internal combustion engine.

A further object of this invention is the provision of a rotary valve type of internal combustion engine of the above mentioned and hereinafter described character, which includes novel means for lubricating the same and for drive of the same.

A further object of this invention is the provision of a novel type of rotary valve internal combustion engine, embodying a relatively simple and efficient type of valve construction which may be attached to existing types of internal combustion engines, without material alteration.

A further specific object of this invention is the provision of a novel type of rotary valve construction adapted for individual use with a cylinder of an internal combustion engine, embodying novel means formed in the block and cylinder head of the engine to seat the valve and prevent escape of gases through the conventional gasket plates between the block and cylinder head.

Other objects and advantages of this invention will be apparent during the course of the following detailed description.

In the accompanying drawings, forming a part of this specification, and wherein similar reference characters designate corresponding parts throughout the several views, Figure 1 is a fragmentary cross sectional view taken longitudinally through a novel type of internal combustion engine, embodying the improved rotary valve construction, the view being taken on a vertical plane and intersecting but two of the cylinders.

Figure 3 is a transverse cross sectional view taken on a horizontal plane through the cylinder block and valves therefor, showing the ported arrangement of the valves with respect to the various cylinder intake and exhaust ports.

Figure 4 is a sectional view taken transversely through the internal combustion engine with the cylinder head and valve removed, the same showing opposite half sections through the cylinder and through the cylinder block between the cylinders.

Figure 5 is a plan view of the improved valve.

Figure 6 is a side elevation of the improved valve showing the port and gear teeth therefor.

Figure 7 is a fragmentary cross sectional view taken on the vertical plane longitudinally of a modified form of internal combustion engine, showing the adaptation of the novel rotary valve to existing types of motors.

Figure 8 is a fragmentary plan view with the cylinder head removed to show the valve arrangement and its drive gearing.

Figure 9 is a longitudinal cross sectional view taken through the cylinder head of the novel internal combustion engine.

Figure 10 is a longitudinal cross sectional view taken through the valve block or head portion of the engine casing of the type of valve construction to be applied to existing motors.

Figure 1:
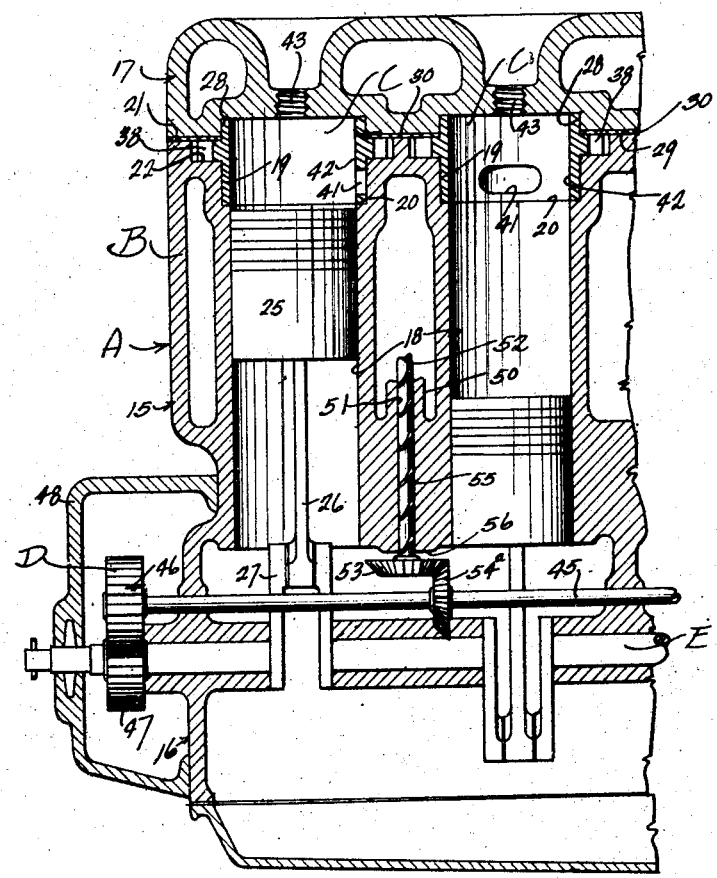
Figure 2:
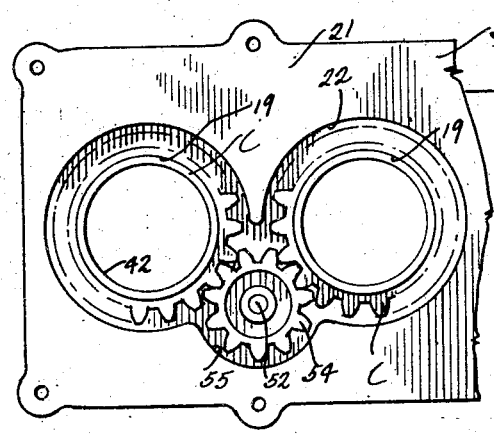
Figure 2 is a fragmentary plan view of the internal combustion engine, with the cylinder head removed, to show more clearly the valves and drive gearing therefor.

In the drawings, wherein for the purpose of illustration are shown preferred and modified forms of this invention, the letter A may generally designate the improved internal combustion engine especially adaptd to receive the rotary valve, which includes the housing B; valve C for the cylinders of the housing B; and means D for driving the valves C in synchronism with each other and with the crank shaft E. These reference characters apply to both the forms of invention illustrated in the drawings, and the differentiating of the forms is hereinafter set forth.

Referring to the rotary valve construction as applied to internal combustion engines of special types, as illustrated in Figures 1 to 4 inclusive, this type of engine A includes an integral valve seat and cylinder block construction 15; crank case 16; and cylinder head 17. The valve seat and cylinder block construction 15 is provided with any approved and desired number of cylinder chambers 18 therein, and these cylinder chambers upwardly thereof are provided with an annularly enlarged seat 19, to give bearing to the lower portion of the valve C as will be subsequently mentioned; the juncture of the cylinder chamber 18 with the seat 19 provides a shoulder 20 for receiving the lower edge of the valve C. Inwardly of the top surface 21 of the construction 15, for each cylinder chamber 18, is a seat or recess 22, annularly surrounding the cylinder chamber and seat 20 in concentric relation therewith, adapted to receive the gear tooth portion of the valve C therein in a bearing and a receiving relation, so that the upper surface of the gear portion of the valve C lies flush with the top surface 21, as is illustrated in Figure 1 of the drawings.

The crank case 16 of the engine housing B is of conventional formation, and the same supports the crank shaft E therein. The crank shaft E is of course connected to the pistons 25 operating in the cylinder chambers 18, by means of connecting rods 26 which are oscillatively connected to the throw portions 27 of the crank shaft, in accordance with conventional construction. The throw of the crank shaft is such that the pistons 25 reciprocate in the chambers 18, and at their uppermost position they do not pass the shoulder 20, although the pistons may pass the shoulders 20 and enter the valve C slightly, just so as to not interfere with the ports of the valves C; this feature being permitted for the reason that the inner periphery of the chamber of the valve C has the same diameter as the cylinder compartment 18, as is shown in the drawings.

The cylinder head 17 in the main serves the same purpose as any engine cylinder head, but the same is provided with special features adapted to cooperate in the proper seating and gas sealing of the valves C. To this end, the cylinder head C for each cylinder of the engine A is provided with a circular recessed seat 28 extending upwardly therein from the lower surface 29 of the said cylinder head; the recesses 28 being provided for the purpose of receiving therein the upper portions of the valves C; so that the valves C extend both in the cylinder head and in the construction 15 of the engine, extending past and through the gasket 30 provided between the construction 15 and head 17, to effect a leak-proof connection.

The valve seat and cylinder block construction 15 and head 17 are of course provided with water compartments therein, these parts of the casing or housing B being jacketed to properly circulate the water in accordance with conventional practice.

Referring now to the novel type of valve C, the same in the main comprises a hollow cylindrical shaped body portion 35, which exteriorly thereof intermediate the upper and lower edges 36 and 37 thereof is provided with an annular series of teeth 38, subdividing the body 35 in a transverse plane into an upper cylindrical shaped bearing extension 39 and a lower cylindrical shaped ported bearing extension 40 which has the valve port 41 arranged therein; this port 41 preferably being elongated circumferentially about the valve body 35. The body 35 is provided with the chamber 42 therein open at both ends of the valve body; the diameter of this chamber 42 as above mentioned preferably being the same as the diameter of the cylinder chamber which receives the valve.

As is illustrated in Figure 1 of the drawings, when the valve C is in its seat 19 in the construction 15, the valve chamber 42 aligns with the cylinder chamber 18. The valve C has a simple but effective bearing in its seat 19; and upon the recess seat 22 which receives the gear teeth and also on the shoulder 20 which receives the lower edge 37 of the valve. The gasket 30 of the engine is properly apertured to snugly receive therethrough the upper valve extension portion 39 of each valve, so that the extension bearing 39 of each valve projects above the gasket and seats in the seat 28 provided in the cylinder head to receive the same; the structure thus provided in the cylinder head effecting an absolutely leak-proof connection for this type of rotary valve, which is highly essential and desirable, since gaskets are of notorious inefficiency by reason of compression leaks, so that the novel feature of projecting the bearing portion 39 of the valve into seating and bearing relation in the cylinder head 17 is a feature which really renders this type of rotary valve efficient and practical. In this connection I am aware that hollow valves of the rotary type have heretofore been provided for engines, but they do not effect the leak-proof connection at the gasket that my valve accomplishes.

A spark plug receiving opening 43 is axially provided in the cylinder head 17 with respect to each of the cylinders of the engine; the aperture 43 thus axially aligning with the axis of the valve, so that the electrodes of the spark plug may project into the chamber 42 into proper sparking relation with the compressed charge.

Referring to the means D for driving the valves C in synchronism with the crank shaft E, the same includes what I prefer to term a rotary shaft 45, which is rotatably supported by the housing adjacent the crank shaft E, and longitudinally in parallel relation therewith. This rotary shaft 45 is geared as by means of gears 46 and 47 with the crank shaft E forwardly thereof; the gears 46 and 47 of course being suitably enclosed by a housing 48. In the cylinder block between each pair of cylinder chambers 18 I provide a bearing sleeve 50, of integral construction with the cylinder block material, which rotatably receives in the passageway 51 thereof, a vertical drive shaft 52. This drive shaft 52 at its lower end is connected with a bevel gear 53 in meshing relation with a bevel gear 54ª of the rotor shaft 45. The shaft 52 extends upwardly through its passageway 51 of the bearing sleeve 50 and exits through the upper surface of the construction 15, and there is provided with a pinion 54, seating in a recessed portion 55ª provided inwardly of the top surface of the valve seat portion of construction 15; the pinion 54 being in meshing relation with the gear teeth 38 of both of the valves C for the cylinders 18 between which the said drive shaft 52 is positioned. Thus, for each pair of cylinders of the engine a drive shaft 52 and pinion 54 is provided; the drive shaft and pinion being adapted thus to each drive a pair of the valves C in synchronism with each other and with the crank shaft E. Of course the gearing as provided by the gears 46 and 47 and drive pinion 54 and the gear pitch of the teeth on the valves C are such that the valves C are each rotated one complete revolution for two complete revolutions of the crank shaft E.

A novel feature of the invention, which renders the same of efficient and practical importance is the simple means for lubricating the bearing surfaces of the valves C, without the provision of special complicated and expensive pumping. This lubrication is effected by providing each one of the drive shafts 52 with a spiral duct or groove 55 inwardly of the outer surface thereof, for preferably the complete length thereof. As is noted from the drawings, the bevel gear 53 at the lower end of the drive shaft 52 is disposed in spaced relation below the adjacent facing surface or edge 56 of the engine housing, to enable the lubricant to splash upon the top surface of the gear 53, and enter the spiral groove 55 which is partly exposed below the surface 56, and incident to the direction of rotation of the shaft 52, the oil will be forced upwardly along the shaft, and exit along a small duct or way 60ª toward the valves C, to convey the lubricant thereto. It is to be particularly noted that the drive pinion 54 and the gear teeth of the valves C at their upper surfaces lie about flush with the top surface 21 of the construction 15, and do not interfere with the gasket 40.

As to the operation of the engine, referring particularly to Figure 3, in order to understand the synchronous operation of the valves, each of the valves C is properly seated so that the port 41 of each valve may register with its respective cylinder intake and exhaust ports. For the cylinder 18ª, as illustrated in Figure 3, the valves C has rotated until the port 41 thereof is in the position shown, and in this position the piston of the cylinder 18ª is at the top of its upstroke and has compressed the charge in the cylinder 18ª, so that it is ready for ignition. It is preferred that the firing order of this engine be 4—3—1—2, and thus for the next adjacent cylinder 18ᵇ, the piston is at the bottom of its stroke, and the valve C of this cylinder is in such position that its port 41 has just passed registration with the inlet port 60 thereof and has drawn in a supply of gas to the cylinder 18ᵇ. Referring now to the cylinder 18ᶜ, the piston of this chamber is at the top of its upstroke, and the valve port 41 of the valve C in the said chamber 18ᶜ has just passed registration with the exhaust port 61 and has permitted the exit of the explosive gases. It will next register with the inlet port 60 on the downstroke of the piston to permit the drawing in of supply of gas to the cylinder 18ᶜ. In the cylinder 18ᵈ the piston is at the bottom of its stroke where it has been driven by explosion of the gases, and the valve C is in position so that its valve port 41 will next register with the exhaust port 61 to permit driving out of the exploded gases.

The operation of the engine and its valve structure may of course differ from that above described, in so far as sequence and mode of operation is concerned. The ports of the valves directly control communication between the intake and exhaust ports 60 and 61, and they have a direct bearing on the housing B, to simplify the engine construction, and no parts project into the valve C to provide bearings or other friction surfaces.

Referring now to the form of invention as illustrated in Figures 7 to 10 inclusive, where the improved type of valve construction is to be adapted to existing types of motors, the valve seat and cylinder block construction consists of the cylinder block 70, and valve seat providing a block portion 71 which is detachable with respect to the cylinder block 70. In addition to the portions 70 and 71 the housing of this form of invention the cylinder head 72 is provided, of quite similar construction to the cylinder head as above described.

The cylinder block 70 is of course the conventional block to which the special valve block 71 and cylinder head 72 are attached; the special parts 71 and 72 being detailed in Figures 9 and 10 of the drawings, and shown in assemblage in Figure 7. The cylinder block 70, of course is provided with the cylinder compartments 73, in which the pistons 74 are reciprocable and attached to the crank shaft E by means of connecting rods 75.

The valve block 71 is substantially flat, with circular shaped openings 76 therethrough for each cylinder compartment 73, these openings 76 having the upper enlarged valve seating portion 77 of a greater diameter than the cylinder chambers 73, and at the lower portion the block 71 has annular flanges 78 inwardly extending to provide the openings 76 of the same diameter as the compartments 73 with which it aligns in flush relation. Thus, the flange 78 provides a shoulder 79 facing the seat opening 77, and upon which shoulder the lower edge of the valve C may rest, as is illustrated in Figure 7. Inwardly of the upper surface 80 of this valve block 71 recesses 81 are provided, continuously from end to end of the block 71, adapted to receive the valve teeth and their connecting gears, as will be subsequently described.

The cylinder head 72 is of preferably the same formation as the cylinder head 17 above described, the same being provided with a circular seating recess 85 for each valve C, of the same diameter as the valve sealing opening 77 with which it aligns, and axially disposed screw threaded openings 86 are provided for receiving spark plugs, as above described. The parts 70, 71 and 72 are all provided with water jacketed portions to provide water compartments in communicating relation, as is illustrated in Figures 7, 9 and 10 of the drawings.

Between the block 70 and the valve block 71 of the housing structure B, a gasket 88 is provided, which has openings therethrough of preferably the same diameter as the cylinder compartment 73, for alignment therewith to accommodate pistons 74. In similar manner a gasket 89 is placed between the cylinder head 72 and the valve block 71, with openings therethrough to receive the upper valve portions 39 in snug relation therethrough.

Referring to the driving means D for the valve C for the form of invention illustrated in Figures 7 to 10 inclusive, a special driving connection between the one end of the crank shaft and the valves is provided, which may be effected without alteration to the crank shaft or engine crank case structure.

The valves are geared together by means of pinions 90, rotatably supported in the recess 81 of the valve block 71, each pinion 90 being disposed intermediate a pair of the valves C and in meshing relation with the teeth of said valves, as is illustrated in Figure 8 of the drawings, the pinions 90 being rotatably mounted upon shafts 91, the ends of which rotatably bear in suitable openings 92 and 93 provided in extension portions 94 and 95 of the valve block 71 and cylinder head 72 respectively, as is illustrated in the drawings, and thus providing a very compact gear connection for the valves. Thus, all of the valves are connected for synchronous drive, and the connection of the end valve C with the crank shaft E is effected as shown in Figure 7. This means of connection contemplates the provision of a special bracket casing 100, detachably connected as by bolts 101 to one end of the engine housing. A bevel gear 103 is mounted at the exterior end of the crank shaft E, which is adapted to mesh with a bevel gear 104 supported by the lower end of a drive shaft 105; the latter snugly bearing in the passageway 106 of a sleeve 107 which is part of the bracket 100. Integral with the sleeve 107 at the lower end thereof the bracket 100 includes a casing portion 108 enclosing the bevel gears 103 and 104 and providing a lubricating compartment 109 adapted to receive lubricant in any approved manner from the crank case, as through a port 110. It is to be noted that the top surface 111 of the bevel gear 104 is spaced from the lower surface 112 of the bracket 100, to enable the lubricant to flow upon the top surface 111 of the gear 104, and from thence pass into the spiral groove 115 provided longitudinally upon the shaft 105; the direction of rotation of the shaft 105 forcing the lubricant upwardly along said shaft into the upper portion of said bracket and thence through a duct 117 provided therealong which communicates with the open end of the recess 81 of the valve block, so that the lubricant may reach the gear means for the valves C to lubricate the same. The drive shaft 105 at its upper end supports a gear 120, which is enclosed in a suitable compartment 121 provided in the casing portion 122 at the upper part of the bracket 100; this pocket 121 being open into communicating relation with the open end of the recess 81, and the valve 120, in fact, entering the said open end of the recess 81 for intermeshing with the teeth 38 of the end valve C of the engine as is illustrated in Figure 8 of the drawings.

From the foregoing description of this invention it is apparent that a novel type of valve construction for internal combustion engines has been provided, which is a departure from conventional and known constructions, in the simplicity with which the same is mounted upon special and conventional engine structures, to provide an efficient seal against loss of compression and to properly regulate intake and exhaust. The lubricating means for the valve construction possesses novelty, and the valve as an article and in its combination with other engine structure is a novel departure.

It is of course understood that the sequence of operation of the cylinders may be departed from the above description, although it is preferred that for both forms of invention the application be that as above given.

Various changes in the shape, size, and arrangement of parts may be made to the forms of invention herein shown, without departing from the spirit of the same or the scope of the claims.

I claim:

1. In an internal combustion engine the combination of a housing including a main body provided with a cylinder chamber therein, a rotary valve including a hollow cylindrical body portion of uniform internal and external diameter throughout the length thereof providing a passageway therethrough open entirely in unobstructed relation at the ends of the cylindrical valve body, the body exteriorly thereof having an annular series of extending gear teeth intermediate the ends of the valve body to divide the latter into an upper short portion and a lower longer portion provided with transverse ports, a detachable valve block having a valve seat passageway therein of a diameter to snugly receive the lower portion of the valve below the gear teeth thereof, said detachable valve block having an annular seating flange in the lower end of the valve seat upon which the lower edge of said rotary valve abuts, said flange defining a passageway of the same diameter and lying flush and unobstructed with the cylinder chamber, the valve passageway being of the same diameter and lying flush with the passageway of said flange and the cylinder chamber, said valve block inwardly of the upper surface thereof being recessed and enlarged to rotatably receive the gear teeth of the rotary valve therein throughout the height of said gear teeth so that only the upper portion of said valve above said gear teeth extends above the top surface of said detachable valve block, means to mesh with the gear teeth of the valve and drive the latter, and a detachable cylinder head over the valve block having a shallow recess extending upwardly into the lower surface thereof for rotatably receiving the upper portion of said rotary valve above the gear teeth thereof.

2. In an internal combustion engine the combination of a valve seat and cylinder block construction having a cylinder compartment with an upper enlarged seat and lateral intake and exhaust ducts communicating into said enlarged seat, a hollow cylindrical shaped valve rotatably bearing in said seat and providing a passageway therethrough aligning flush with the cylinder compartment and in unobstructing relation with the cylinder compartment, said valve having a port therethrough communicating directly in an unobstructed relation at all times with the valve passageway, means to rotate the valve in its seat to align the port in a working relation with the intake and exhaust ducts, a detachable cylinder head having a recess extending upwardly into the same for receiving an upper portion of the valve, said portion of the valve being an extension of the valve projecting past the jointed connection between the cylinder head and valve seat and cylinder block construction, the passageway of the valve being entirely free of any portion of the cylinder head projecting thereinto.

3. In an internal combustion engine the combination of a main casing portion having a cylinder chamber therein, a detachable valve block on the main casing having a valve passageway therein of a larger diameter than the cylinder chamber, the valve block at the lower part thereof having an annular flange extending into the passageway and providing a shoulder facing the valve passageway, the annular flange defining an opening therethrough of the same diameter as the cylinder chamber and adapted to align therewith, a valve rotatably seated in the valve passageway in a bearing relation at its lower edge on the annular flange, said valve having a passageway therethrough of the same diameter as the cylinder chamber and lying in flush surface relation therewith, said valve block in the top surface thereof having a recess surrounding said valve, the valve having an annular series of gear teeth lying in the last mentioned recess, said valve providing an annular portion projecting above the gear teeth and thru which the valve passageway also extends, and a cylinder head detachably mounted on the valve block and secured thereto having a recess extending upwardly thereinto into which the upper portion of the valve rotatably extends past the jointed connection between the valve block and cylinder head.

JAMES B. MANKIN.